United States Patent [19] [11] 4,041,529
Masterfield [45] Aug. 9, 1977

[54] AIRPLANE ROUTE VIEWING SYSTEM

[75] Inventor: Clarence William Masterfield, Petaluma, Calif.

[73] Assignee: The Raymond Lee Organization, Inc., New York, N.Y.; a part interest

[21] Appl. No.: 675,727

[22] Filed: Apr. 12, 1976

[51] Int. Cl.² ............................................. H04N 7/18
[52] U.S. Cl. .................................. 358/109; 358/103
[58] Field of Search ............ 178/5.6, 5.8 R, DIG. 38, 178/6.8; 358/109, 103

[56] References Cited

U.S. PATENT DOCUMENTS 2,513,490  7/1950  Jones ............................... 178/5.6 X
3,886,306  5/1975  Fayard et al. ................... 358/109 X Primary Examiner—John C. Martin
Assistant Examiner—Mitchell Saffian
Attorney, Agent, or Firm—Howard I. Podell

[57] ABSTRACT

An airplane route display system for presenting to the airplane passengers, over a television viewing monitor screen, a photographic display of a section of the route viewed by a television camera in the airplane, over which the airplane is being flown. An audio output from a pre-recorded tape describes the scene being viewed by the television camera, with the start of the audio equipment triggered by a remote signal transmitted or reflected from a ground marker serving to synchronize the audio tape. The audio output may also be connected to a microphone for use by aircraft personnel in interjecting a topical comment about the route being displayed.

1 Claim, 3 Drawing Figures

AIRPLANE ROUTE VIEWING SYSTEM

SUMMARY OF THE INVENTION:

My invention is an airplane route display system for presenting to the airplane passengers, over a television viewing monitor screen, a photographic display of a section of the route viewed by a television camera in the airplane, over which the airplane is being flown. An audio output from a pre-recorded tape describes the scene being viewed by the television camera, with the start of the audio equipment triggered by a remote signal transmitted or reflected from a ground marker serving to synchronize the audio tape. The audio output may also be connected to a microphone for use by aircraft personnel in interjecting a topical comment about the route being displayed.

By means of my invention, the passengers of a commercial airplane, traveling over a standard route may be furnished a visual display of the route they are flying over, together with a taped audio narrative describing the visual display, and without requiring the services of the airplane crew. A member of the crew may, at his or her option, interject live comment into the audio output.

BRIEF DESCRIPTION OF THE DRAWINGS:

The objects and features of the invention may be understood with reference to the following detailed description of an illustrative embodiment of the invention, taken together with the accompanying drawings in which.

Figure 1:
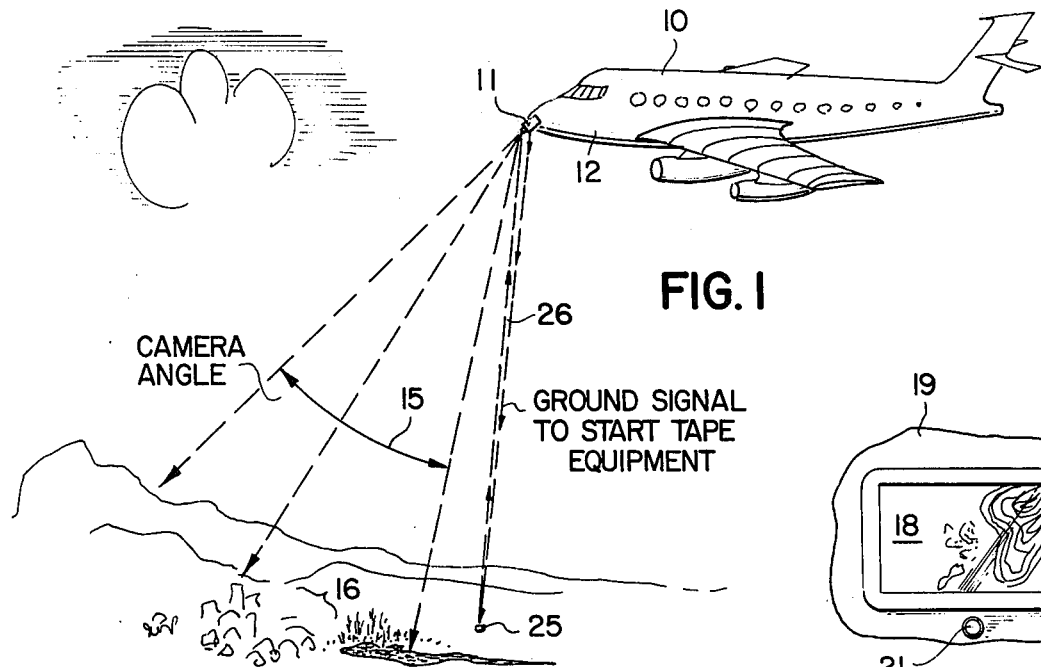
FIG. 1 is a perspective view of the installed invention in use.
Figure 2:
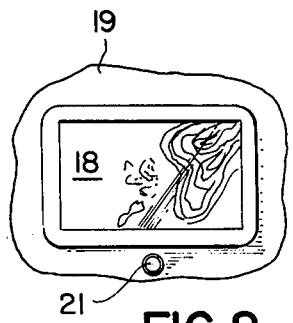
FIG. 2 is an elevation view of the monitoring screen.
Figure 3:
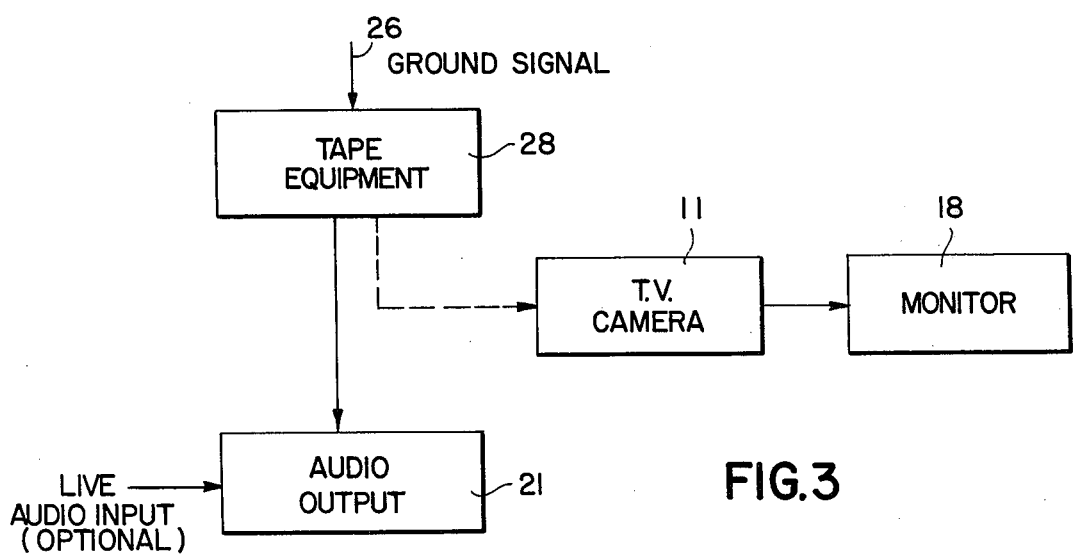
FIG. 3 is a schematic view of the invention.

DESCRIPTION OF THE PREFERRED EMBODIMENT:

Turning now descriptively to the drawings, in which similar reference characters denote similar elements throughout the several views, FIG. 1 shows an equipped airplane 10 fitted with a television camera 11 in the airplane nose 12 focused at a sector 15 of the ground 16 below and forward of the airplane 10 and connected so as to project the image viewed by the camera 11 on a monitor viewing screen 18 located on a panel 19 in the passenger cabin of the airplane. As shown in FIG. 2, the panel 19 contains a speaker 21 which is connected to tape equipment for furnishing an audio narrative to accompany the scenes viewed by the video viewing screen 18.

Synchronization of the recorded audio narrative with the visual picture produced by the camera 11 is accomplished by a ground marker 25 which produces an independent signal or a reflected signal 26 in response to an initial radio signal 27 of the aircraft equipment at a given point in the flight at which the tape equipment 28 is programmed to start. The tape equipment 28, upon receipt of signal 26 starts a pre-recorded audio message to the speaker 21 and simultaneously initiates opertion of the camera 11 and monitor screen 18.

The tape equipment 28 may be triggered to stop upon completion of the recorded message and to turn OFF the camera 11, monitor 18 and signals to the speaker 21 until a second reflected signal 26 is received, initiating the actuation of a second recorded message to accompany a second sequence of visual scenes observed by camera 11, or alternately the unit may be programmed only for viewing of a particularly repetitive section of a route such as the final period of an approach to a terminal airport.

Commercial aircraft customarily carry a radio receiver that is responsive to a directional radio signal transmitted from a fixed ground beacon station, with the receipt of the signal on the aircraft by visual or audio means indicating that the aircraft is passing over the fixed ground beacon station, customarily called a ground marker, such as ground maker 25. U. S. pat. No. 2,513,490 of July 4, 1950 to Loren F. Jones describes a radar "transponder" beacon which may be installed at a fixed ground station, that is responsive to a radio such as radio signal 27 sent from a radar system mounted in an aircraft and which transmits back a modified coded signal such as signal 26 to the aircraft upon the receipt of a radio signal 27.

The recorded message of the tape equipment may deal with the details observed by the camera since the route chosen can be one that is customarily flown over on a specific customary course and speed that is of particular scenic interest to the passengers and which is made of visual interest by use of a telephoto camera lens.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A system for automatic display of visual televised information on an airplane accompanied by a recorded audio narrative comprising a television camera mounted on an airplane focused to televise a pictorial representation of the ground scene below the airplane in flight, said camera joined to a visual monitoring screen in the cabin of the airplane, sound playback equipment connected to a loudspeaker in the said airplane cabin, said equipment equipped with a recorded message describing the sequence of visual scenes that are to be displayed on the said monitoring screen over a particular section of the route of the airplane, said playback equipment activated by radio means on the aircraft in association with ground marker beacon means on the path of said route, said camera and monitoring equipment connected to said playback equipment so that the playback equipment, when activated, serves to actuate the said camera and monitoring equipment such that actuation of said playback equipment causes the playback of said recorded message in synchronization with operation of the said camera and monitoring screen.

* * * * *